(12) United States Patent
Dorfner et al.

(10) Patent No.: US 10,236,734 B2
(45) Date of Patent: Mar. 19, 2019

(54) ROTOR FOR AN ELECTRIC MACHINE

(71) Applicant: SIEMENS AKTIENGESELLSCHAFT, München (DE)

(72) Inventors: Matthias Dorfner, Kirchdorf am Inn (DE); Gerhard Matscheko, Starnberg (DE)

(73) Assignee: Siemens Aktiengesellschaft, München (DE)

( * ) Notice: Subject to any disclaimer, the term of this patent is extended or adjusted under 35 U.S.C. 154(b) by 487 days.

(21) Appl. No.: 14/782,836

(22) PCT Filed: Aug. 27, 2013

(86) PCT No.: PCT/EP2013/067659
§ 371 (c)(1),
(2) Date: Oct. 7, 2015

(87) PCT Pub. No.: WO2014/166554
PCT Pub. Date: Oct. 16, 2014

(65) Prior Publication Data
US 2016/0072349 A1    Mar. 10, 2016

(30) Foreign Application Priority Data
Apr. 8, 2013 (EP) .................. 13162732.5

(51) Int. Cl.
*H02K 1/30* (2006.01)
*H02K 1/27* (2006.01)

(52) U.S. Cl.
CPC ............. *H02K 1/30* (2013.01); *H02K 1/2706* (2013.01); *H02K 1/2773* (2013.01)

(58) Field of Classification Search
CPC .................. H02K 1/28; H02K 1/30

USPC ............ 310/156.12, 156.13, 156.48, 156.49, 310/156.51–156.53
See application file for complete search history.

(56) References Cited

U.S. PATENT DOCUMENTS

| | | | |
|---|---|---|---|
| 6,946,967 B2 | 9/2005 | Klaus et al. | |
| 7,057,312 B2 | 6/2006 | Matscheko | |
| 7,285,890 B2 * | 10/2007 | Jones | H02K 1/278 310/156.16 |

(Continued)

FOREIGN PATENT DOCUMENTS

| DE | 19846924 A1 | 4/2000 |
|---|---|---|
| DE | 10 2011 000 439 A1 | 8/2012 |

(Continued)

OTHER PUBLICATIONS https://www.birmingham.ac.uk/Documents/college-eps/metallurgy/research/Magnetic-Materials-Background/Magnetic-Materials-Background-10-Soft-Magnets.pdf.*
https://www.scienceabc.com/eyeopeners/why-are-some-materials-magnetic-and-is-aluminum-magnetic.html, what causes magnetism, Science ABC.*

*Primary Examiner* — Terrance L Kenerly
(74) *Attorney, Agent, or Firm* — Henry M. Feiereisen LLC

(57) ABSTRACT

A rotor for an electric machine, comprising a modular design consisting of a plurality of modular elements is disclosed. These modules are arranged adjacent to each other in a direction of movement of the rotor. Each modular element has at least one magnet and at least one ferromagnetic pole shoe, and the poles of the magnet are aligned in the direction of movement of the rotor. An electric machine comprising a stator and a rotor according to the invention is also disclosed.

11 Claims, 2 Drawing Sheets

(56) References Cited

U.S. PATENT DOCUMENTS

| | | |
|---|---|---|
| 7,332,839 B2 | 2/2008 | Matscheko |
| 7,638,916 B2 | 12/2009 | Matscheko |
| 7,737,597 B2 | 6/2010 | Matscheko |
| 7,834,489 B2 | 11/2010 | Matscheko |
| 7,859,143 B2 | 12/2010 | Matscheko |
| 7,863,782 B2 | 1/2011 | Matscheko |
| 7,928,613 B2 | 4/2011 | Matscheko |
| 7,936,102 B2 * | 5/2011 | Pabst ................ H02K 1/2773 29/598 |
| 7,952,237 B2 | 5/2011 | Matscheko |
| 8,004,140 B2 * | 8/2011 | Alexander ........... H02K 1/2773 310/156.48 |
| 8,274,195 B2 | 9/2012 | Matscheko |
| 9,130,444 B2 | 9/2015 | Matscheko |
| 9,150,116 B2 | 10/2015 | Matscheko |
| 2004/0004407 A1 | 1/2004 | Laurant et al. |
| 2007/0278865 A1 | 12/2007 | Matscheko |
| 2008/0185932 A1 | 8/2008 | Matscheko |
| 2008/0190732 A1 | 8/2008 | Matscheko |
| 2009/0174266 A1 | 7/2009 | Matscheko |
| 2009/0284104 A1 | 11/2009 | Matscheko |
| 2010/0040488 A1 | 2/2010 | Matscheko |
| 2010/0231059 A1 | 9/2010 | Matscheko |
| 2011/0140561 A1 * | 6/2011 | Clark .................... H02K 1/278 310/156.12 |
| 2011/0187218 A1 * | 8/2011 | Kaessner ............... H02K 15/03 310/156.01 |
| 2013/0241337 A1 * | 9/2013 | Tremelling .......... H02K 1/2766 310/156.19 |
| 2014/0062247 A1 | 3/2014 | Dorfner |
| 2014/0167894 A1 | 6/2014 | Matscheko |

FOREIGN PATENT DOCUMENTS

| | | |
|---|---|---|
| EP | 1 850 454 A1 | 10/2007 |
| EP | 2 645 535 A1 | 10/2013 |
| WO | WO 2012120485 A2 | 9/2012 |

\* cited by examiner

ROTOR FOR AN ELECTRIC MACHINE

CROSS-REFERENCES TO RELATED APPLICATIONS

This application is the U.S. National Stage of international Application No. PCT/EP2013/067659, filed Aug. 27, 2013, which designated the United States and has been published as International Publication No. WO 2014/166554 A1 and which claims the priority of European Patent Application, Serial No. 13162732.5, filed Apr. 8, 2013, pursuant to 35 U.S.C. 119(a)-(d).

BACKGROUND OF THE INVENTION

The present invention relates to a rotor for an electric machine and an electric machine with a stator and a rotor.

Electric machines of this type with movable units in the form of rotors are known in the prior art in principle, obviating the need for separate documentary evidence. In principle, a stator is provided for a rotating electric machine which as a rule provides an essentially circular aperture for receiving a rotor designed as a rotor. The rotor can be pivoted in the aperture, an air gap being formed between the rotor and the stator.

Furthermore, there are electric machines for linear operation in which the stator is at least partially designed along a line of movement or movement curve for a rotor designed as a translator. The translator interacts with the stator and is flexibly arranged along the line of movement and/or the movement curve. The translator is moved along the stator and/or the line of movement by means of controlled magnetic action.

A rotor for the purposes of this disclosure is therefore a movable unit which for a rotating electric machine is designed in the form of a rotor and for an electric machine for linear operation as a translator. As a rule, the stator is stationary with regard to a device or a base plate connected to the ground. In the case of a vehicle, the stator may be connected, for example, to a chassis, an undercarriage or the like, stationary being understood to mean with regard to the device or the base plate. The rotor thus forms the movable unit with regard to the stator.

In particular, in the case of rotating electric machines which are intended for use as torque motors, but also in the case of linear motors for direct drive applications, permanent magnets are frequently used with the rotor. In order to be able to generate the major force desired, as a rule such magnets are sintered rare earth magnets. Due to the high costs of such magnets, such machines are therefore only used in special cases for which such an investment can be adequately justified. There are many applications, however, for which such machines could likewise be used expediently but are not due to the high cost. There is therefore a need for alternatives to replace expensive rare earth magnets, in particular, NdFeB sintered magnets, for example.

One approach provides for the replacement of such magnets with ferrite magnets. It has been shown that compared to rare earth magnets, ferrite magnets have a substantially lower energy density, that is to say, they provide a lower magnetic flux, and—for example, due to the large dimensions required—cannot be put to practical use with the usual structures envisaged.

SUMMARY OF THE INVENTION

It is therefore the task of the invention to specify a rotor for an electric machine for which the expensive rare earth magnets can be replaced by ferrite magnets, wherein the performance of the electric machine should essentially be maintained.

As a solution, the invention proposes a rotor for an electric machine which has a modular structure comprising a plurality of modular elements adjacent to each other in a direction of movement, wherein each modular element has at least one magnet and at least one ferromagnetic pole shoe and the poles of the magnet are aligned in the direction of movement of the rotor.

An electric machine is a device which converts electrical energy into mechanical energy, in particular kinetic energy (motor mode) and/or mechanical energy into electrical energy (generator mode).

A rotating electric machine is an electric machine for which a stator provides an as a rule circular aperture in which a rotor can be pivoted. Unlike the rotor, the stator is torque-proof, for which reason the stator is connected, for example, to a rest such as a base plate or the like so that as a rule it does not perform any rotational movement. Nevertheless, the electric machine and therefore the stator as well, may naturally be arranged in a mobile fashion, for example, on a vehicle or the like.

The stator and the rotor are linked by means of a magnetic flux, whereby a force which rotates the rotor opposite the stator is generated in motor mode, and mechanical energy supplied to the rotor in generator mode is converted into electrical energy. For this purpose, the stator and the rotor each have a coil through which a current flows. In the stator or in the rotor the coil may also be formed or supplemented by a permanent magnet. Rotating electric machines of this type are, for example, induction machines which are connected to a multiphase, in particular three-phase electrical grid, such as asynchronous machines, synchronous machines with or without a damper cage or the like. However, they may also be direct current machines such as, for example, shunt motors, series-wound motors, stepping motors, and/or the like.

For the first time the invention enables an electric machine to be equipped with a permanently excited rotor which may not only be equipped with rare earth magnets, but also with alternative magnets such as ferrite magnets or the like, wherein the major forces known from the use of rare earth magnets can be obtained at the same time. This is essentially achieved as a result of the poles of the magnets no longer being aligned in the direction of the air gap but transversely, i.e. parallel to a surface of the rotor facing the stator of the electric machine, in contrast to the prior art. By means of the pole shoe, the magnetic flux provided by the magnets is deflected in the direction of the stator. This structure thus enables magnets with virtually arbitrary dimensions to be incorporated into the rotor of the electric machine. This also makes it possible to use weaker magnets with regard to rare earth magnets, in particular, ferrite magnets, wherein at the same time the performance-related properties of the electric machine can essentially be retained.

The rotor has a modular structure comprising a plurality of modular elements that are arranged adjacently to each other in a circumferential direction for this purpose. Preferably at least one individual pole shoe is assigned to each pole of the magnet in the case of each modular element. The modular elements may be provided as individually manageable assemblies which are interlinked to form the rotor in the direction of movement. Furthermore, the modular elements may be favorably produced in series in terms of technical production and be assembled to form a rotor as required, in particular individually. This permits a high degree of flexibility with regard to the production of the rotor, making an individual response to customized solutions possible as a result. This clarifies why it is possible to significantly increase the degree of freedom for the dimensions of the magnet with regard to the prior art.

Thus, flux densities otherwise only attainable with rare earth magnets in the prior art are also attainable using ferrite magnets. Furthermore, with the simultaneous use of rare earth magnets, the invention permits substantially higher flux densities to be attained than previously customary in the prior art. As a result, highly compact and powerful electric machines can be realized.

The magnets may be mechanically designed as cuboids, rods, in particular round rods, combinations hereof or the like. As a rule, the magnetic poles of the magnet are located at opposing ends of the magnet.

The magnets may be made of a ferrite material such as iron oxide or the like. They may be designed both as ferrite magnets without the addition of rare earth and as higher-grade LaCo3 ferrites. The latter make higher force densities possible. The magnets may already be magnetized before assembly. Furthermore, however, it is also possible for them not to be magnetized until after the assembly of the rotor, for example, when the modular elements and/or rotor segments are assembled on the rotor or the like. In particular, the magnets may be magnetized on the fully assembled rotor.

The pole shoe is a magnetic conductor, preferably comprising a ferromagnetic or magnetically soft material, and therefore particularly suitable for the conducting of magnetic flux. The pole shoe may be laminated to the pole shoe in an axial extension of the rotor. As a result, it can conduct the magnetic flux with low losses. A pole shoe of a Soft Magnetic Composite (SMC) material, by means of which a particularly high level of efficiency with regard to conduction of the magnetic flux can be achieved, is particularly advantageous.

According to one embodiment, the rotor has at least one rotor segment comprising a plurality of adjacently arranged modular elements. As a result, a rotor segment arrangement can be created in which an appropriate plurality of rotor segments is arranged on the rotor in a circumferential direction, forming a magnetically active area of the rotor. As a result, the rotor can easily be developed flexibly, in particular individually. The rotor segments may be handled as individual units.

Preferably, the pole shoe has a contact surface for contacting one of the poles of the magnet. As a result, the magnetic field of the magnet can be gathered with as little loss as possible and deflected to the external surface of the rotor, that is to say, into the air gap of the electric machine.

Moreover, the pole shoe can taper off, starting from a surface of the rotor facing a stator of the electric machine. As a result, the pole shoe may prove more economical, and weight can be saved. From an electromagnetic perspective, namely, the full cross-section of the pole shoe over the entire pole surface of the magnet is unnecessary as the pole shoe on the surface facing the stator should essentially conduct the entire flux of the magnet but this declines with decreasing depth in the rotor. Therefore, the further one is from the surface of the rotor facing the stator, the less flux has to be conducted by the pole shoe.

Moreover, it may be envisaged that the pole shoe extends over part of the contact surface of the pole. As a result, an overhang of the magnet on the side facing away from the air gap is generated inside the rotor. This reduces the formation of undesirable magnetic stray paths on the surface of the magnet between the poles, in particular inside the rotor. In this way, the magnetic flux of the magnet can be concatenated to the stator with minimal loss so that high force densities can be achieved, in particular with torque motors.

The pole shoe may have punch-bundled sheet metal bodies which are stacked at right angles to the direction of movement. This enables the pole shoe to have a simple structure which also makes a high degree of flexibility possible in terms of individual adjustments. The punch-bundled sheet metal bodies can be fastened frictionally and/or positively to the corresponding magnet by means of adhesive bonding.

Furthermore, the pole shoe may also comprise a sintered body and/or an amorphous metal. Both materials enable the reduction of iron losses in the pole shoes to be improved.

Advantageously, provision may also be made for the pole shoe to have a retaining projection for the magnets on the stator side. Additional fixation of the magnets can be achieved by this means and the overall stability of the rotor thus also improved for high loads. In particular, with the development of rotors radial forces can be better absorbed on account of the rotation of the rotor.

Preferably, two adjacent pole shoes of two adjacent modules form a space in which a fixing device is arranged. This embodiment proves particularly advantageous in combination with tapering pole shoes for which the space formed enables extensive structural measures for the fixing device. This enables the rotor to achieve additional stability, in particular additional stability in an axial direction.

The fixing device can be fastened in its position by means of end plates according to a further embodiment. This makes assembly easier and further improves stability at the same time.

A further embodiment provides for the pole shoe and the magnet to be fastened to a support structure. The support structure can not only serve as an assembly aid for the movable unit but it can also provide additional stability. Furthermore, the support structure can further support the position of the modular elements in relation to each other. In particular, the support structure for a rotor can also serve to absorb radial forces of the modular elements and thus further improve the mechanical stability of the rotor. The support structure may furthermore serve to provide the force or movement provided by the rotor for an intended use. A component to be driven can be connected to it.

The support structure can be laminated transversely to the direction of movement. This enables the design of the support structure to be individually adapted to the respective requirements. Production can be further simplified, in particular individualized.

The support structure is preferably made of an essentially non-ferromagnetic or paramagnetic material, preferably of a diamagnetic material. As a result, leakage flux, in particular inside the rotor, may be largely reduced and the efficiency of the electric machine improved. The support structure may, for example, consist of aluminum sheets, austenitic stainless steel sheets and/or the like. Furthermore, it may also consist of a milled aluminum or a milled stainless steel structure.

The support structure may have a formation with an undercut recess for the insertion of a slot nut. The slot nuts may, for example, be standardized DIN slot nuts. Modular elements or even groups of modular elements can be fastened by means of the slot nuts in order to form a connection between the rotor and the component to be driven.

The fastening of the pole shoe and the magnet to the support structure may comprise a curing grout. Simple and stable assembly can be achieved in this way.

Furthermore, the fastening may have a projection arranged on the pole shoe which engages in a stop notch of the support structure. By this means, the stability of the rotor can be further improved. In particular, the absorption of radial forces can be further improved for a rotor.

The rotor may also have a fixing element which extends through the support structure. Preferably the fixing element can also be provided between two adjacent pole shoes, and pass through the support structure. This enables the stability of the rotor to be further improved.

According to a further embodiment it is proposed that at least one magnet and at least one pole shoe of the modular element be joined together frictionally and/or positively with grout. In this way, a modular element can be inexpensively created which can be handled as a component and permits a high degree of flexibility in the production of the rotor. Furthermore, a high-strength bond can be produced. 2k polyurethane, 2k epoxy resin or a comparable material can be used as grout, for example.

A development of the invention provides for the modular elements being joined frictionally and positively to the support structure with the grout. A material as previously described with regard to the modular element can be used as grout. By this means, it is possible to achieve simple fastening of the modular elements to the support structure which can simultaneously provide a high level of stability.

A further embodiment provides for the support structure being made of a non-magnetic metal, in particular a non-magnetic light metal, preferably of aluminum. The influence of the support structure on the magnetic properties of the rotor can be kept to a minimum by the non-magnetic metal during normal operation. At the same time, the use of a light metal such as aluminum enables the physical mass of the rotor to be kept to a minimum.

Furthermore, according to an embodiment the support structure may be formed of stacked sheets in an axial extension of the rotor. As a result, the influence of the support structure on the magnetic properties of the rotor can be further reduced during normal operation. It is even more favorable if according to a development the stacked sheets are electrically insulated from each other, for example, if they have an insulating lacquer coating, an insulating oxide coating and/or the like on their surface. The sheets are preferably approximately 1 mm to approximately 10 mm thick.

With the invention an electric machine with a stator and a rotor are also proposed, wherein—as previously described—the rotor is designed according to the invention. This makes it possible to achieve an inexpensive, powerful electric machine. In particular, the use of rare earth magnets can be reduced or even avoided.

BRIEF DESCRIPTION OF THE DRAWINGS

Additional features and advantages can be found in the following description of an exemplary embodiment. The description only serves to illustrate the invention and should not limit it.

The diagrams show.

DETAILED DESCRIPTION OF A PREFERRED EMBODIMENT

Figure 1:
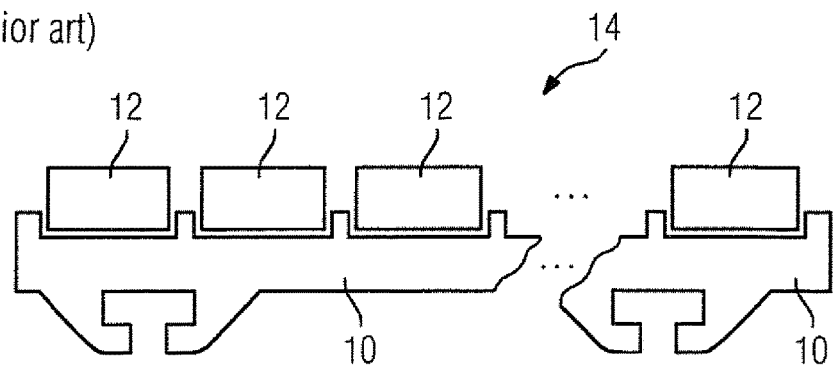
FIG. 1 a side view of a diagrammatically linearized rotor segment of a rotor segment arrangement for a rotor of the prior art, FIG. 2 a cutaway view through a diagrammatically linearized rotor segment of a rotor segment arrangement for a rotor with a modular structure according to the invention, FIG. 3 an enlarged diagrammatic cutaway view of the support structure in FIG. 2 with an assembly concept for the rotor segment arrangement according to the invention and FIG. 4 a diagrammatic view of a cross-section through a rotating electric machine with a rotor with a rotor segment arrangement according to FIG. 2 of the invention.

FIG. 1 is a diagrammatic side view of a section of a rotor embodied as a rotor 14 of a rotating electric machine of the prior art not shown in further detail. The rotor 14 has a rotor segment arrangement which is not described, of which part of a rotor segment is shown diagrammatically in a side view in FIG. 1. For further simplification, the curve in FIG. 1 is likewise not shown.

The rotor segment has a support structure 10 which is fitted with rod-shaped rare earth magnets 12 on its surface facing the stator. The poles of the rare earth magnets 12 are radially aligned, that is to say, one pole of one magnet 12 is facing the air gap in each case, wherein adjacent magnets 12 alternate in the direction of movement of the north and south pole. The installation of the rotor 14 in the electric machine and the mode of action of this known machine are not dealt with here, particularly as the person skilled in the art is sufficiently familiar with them.

Figure 2:
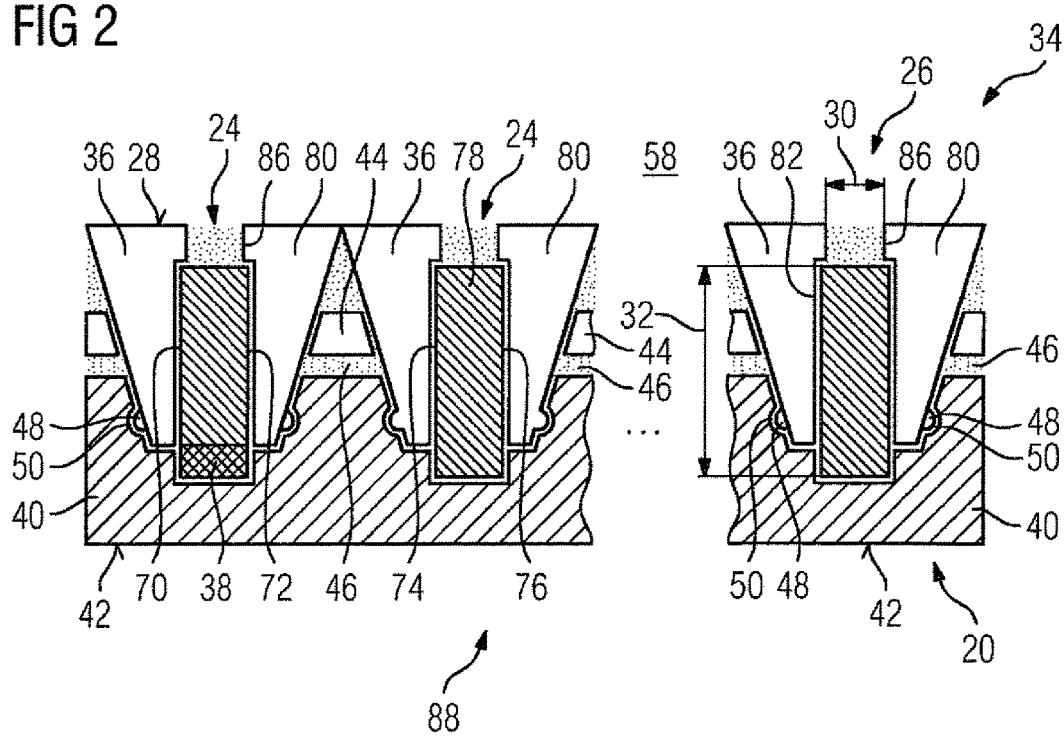

FIG. 2 shows a section of a rotor 20 designed as a rotor which has a rotor segment arrangement 34 (FIG. 4) in perspective cutaway view, of which a section of a segment 88 is shown in diagrammatic cutaway view in FIG. 2. The rotor 20 is part of a rotating electric machine in the form of a torque motor 66 (FIG. 4) and spaced from a stator 62 by an air gap 58. Here too, the rotor-related curve is not shown in the figure.

The rotor segment 88 shown in FIG. 2 has a modular structure and consists of a plurality of modular elements 26 according to the invention which are arranged adjacently to each other in a direction of movement.

Each modular element 26 in this embodiment has a ferrite magnet 22, 78 and two ferromagnetic pole shoes 36, 80. The pole shoes 36, 80 are made of an SMC material in this case. The ferrite magnet 22 has a north pole 70 and a south pole 72, whereas the ferrite magnet 78 has a south pole 74 and a north pole 76. The poles 70, 72, 74, 76 of the ferrite magnets 22, 78 are aligned in a direction of movement. The poles of the ferrite magnets 22, 78 are therefore aligned opposite each other. Unlike the prior art, with the invention consequently none of the magnetic poles of the magnets are directly facing the stator. The ferrite magnets 22, 78 in this embodiment have a magnet height 32. This may be selected depending on the desired magnetic flux.

Each pole shoe 36, 80 has a contact surface 82 which contacts the respective pole 70, 72, 74, 76 of the ferrite magnet 22, 78 in this embodiment. As a result, the magnetic flux of the respective magnet can be introduced into the pole shoe 36, 80 largely free of losses.

At the ends of its pole shoes 36, 80 facing the air gap 58, the magnetic flux is discharged from the pole shoes 36, 80 into the air gap. The magnetic flux is thus radially aligned in the direction of the stator. The pole shoes 36, 80 consequently bring about deflection and guidance of the magnetic flux from the respective poles to the air gap 58.

The ferrite magnet 22, 78 and the pole shoes 36, 80 assigned to it are connected to each other by means of grout 46—forming the respective modular element 26. 2k polyurethane is used as grout 46 in this case. However, alternative grout such as, for example, 2k epoxy resin or the like may also be used. Furthermore, the modular elements 26 are connected to the respective rotor segment 88 by means of the grout 46.

Furthermore, FIG. 2 shows that the pole shoes 36, 80 taper off starting from a surface 28 of the rotor 20 facing the stator 62 of the torque motor 66. As can also be seen from FIG. 2, the pole shoes 36, 80 extend over part of the contact surface 70, 72, 74, 76 so that the ferrite magnets 22, 78 form a magnet overhang opposite the pole shoes 36, 80 on the side opposite the air gap 58. As a result, the pole shoes 36, 80 can be smaller and more compact overall.

Alternatively, the pole shoes 36, 80 may have punch-bundled sheet metal bodies which are stacked at right angles to the direction of movement of the rotor 20. As a result, the pole shoes 36, 80 can be adjusted to any machine designs of the electric machine as required. Furthermore, the pole shoes 36, 18 may comprise an amorphous metal.

As a result of the arrangement of the ferrite magnets 22, 78 provided for in this embodiment, two respective adjacent pole shoes 36, 80 of two adjacent modular elements 26 together form a magnetic pole on the surface 28 on the rotor side of the rotor 20.

As can further be seen from FIG. 2, the pole shoes 36, 80 in the vicinity of the surface 28 on the rotor side each have a retaining projection 86 for the ferrite magnets 22, 78. Especially with the rotating electric machine, it is possible to ensure that the additional absorption of radial forces can be achieved for the rotor 20 during normal operation. The strength and stability of the rotor 20 can be further increased overall.

Furthermore, it can be seen from FIG. 2 that two adjacent pole shoes 36, 80 respectively of two adjacent modular elements 26 form a space in which a fixing device 44 is arranged. The rotor segment of the rotor segment arrangement 34 can be given additional axial strength by the fixing device 44.

In this embodiment the pole shoes 36, 80 of a respective modular element 26 form an aperture with an aperture width 30 on the surface 28 on the rotor side. This reduces leakage flux in the region of the surface 28 on the rotor side, as a result of which there is an overall improvement in magnetic concatenation for the torque motor 66.

The figures do not show that the fixing device 44 is fixed in its position by means of end plates.

Figure 3:
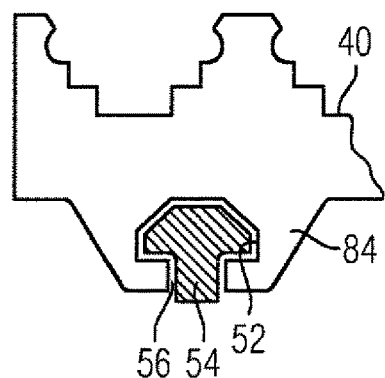

Furthermore, FIG. 2 shows that the pole shoes 36, 80 and the ferrite magnets 22, 78 are fastened to an aluminum support structure 40 of the rotor 20. Alternatively, the support structure may also be made of another non-magnetic metal, in particular light metal. The support structure 40 has an inside surface 42 which can be connected to a component to be driven which is not shown. For this purpose, the support structure 40 has an overhang 84 on the inside surface 42 in which there is a recess 56 in the form of a longitudinal slot in an axial direction (FIG. 3). The longitudinal slot 56 has an undercut 52, making it suitable for the admission of slot nuts 54. The component to be driven and which is not shown can be connected to the rotor 20 via the slot nuts 54. By this means, a reliable attachment to the component to be driven can easily be achieved.

The present support structure 40 is laminated at right angles to the direction of movement of the rotor 20. As a result, it is possible to easily adjust the support structure 40 to the respective machine requirements.

In order for the torque motor 66 to operate with maximum efficiency, it is further proposed that the support structure 40 be formed of an essentially non-ferromagnetic or paramagnetic material, preferably of a diamagnetic material. In the present embodiment the support structure comprises a milled aluminum structure. Alternatively, the support structure 40 may also comprise a milled stainless steel structure of, for example, austenitic stainless steel sheets.

The ferrite magnets 22, 78 are made of a ferrite material in this case. Naturally, they may also have added rare earth as a result of which higher force densities can be achieved.

The attachment of the components of the modular elements 26 may moreover be achieved by means of casting using artificial resin as grout 46. Furthermore, attachment can also be achieved by means of dipping in a bath of lacquer, resin or the like.

For additional improvement of the strength and stability of the rotor 20, on each of the pole shoes 36, 80 respectively the attachment has an arranged projection 48 which engages in a stop notch 50 of the support structure 40.

Figure 4:
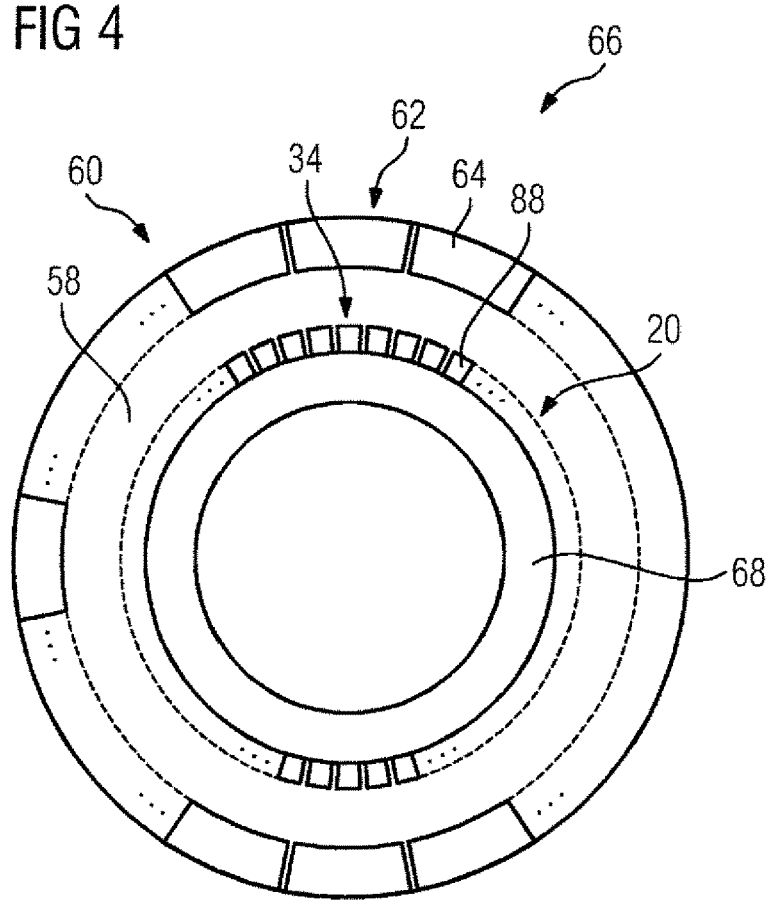

In a diagrammatic cutaway view, FIG. 4 shows the torque motor 66 which has the stator 62 and the rotor which can be pivoted inside the stator 62 as rotor 20. Like the rotor 20, the stator 62 is segmented and has stator segments 64 that are arranged adjacently to each other in the circumferential direction of the torque motor 66. A stator segment arrangement 60 of the torque motor 66 is formed by this means. Moreover, the air gap 58 can be seen between the external surface 28 on the rotor side of the rotor 20 and an internal surface of the stator segment arrangement 60. In this case the rotor segments 88 are attached to the support structure by means of the grout 46.

The description of the exemplary embodiment only serves to illustrate the invention and should not restrict it. In particular, the invention may naturally be used both for rotating electric machines and for electric machines for linear operation. Furthermore, it should also be evident to the person skilled in the art that naturally the stator can also be equipped according to the invention if the stator is permanently excited. Then the invention only has to be transferred from the rotor to the stator in dual fashion. Furthermore, features and exemplary embodiments can be combined with each other as required.

The invention claimed is:

1. A rotor for an electric machine having a stator, said rotor comprising:
   a plurality of modules that are arranged adjacent to each other and connected to each other in the direction of the movement of the rotor, each module including at least one ferrite magnet, the poles of each—magnet being aligned in the direction of movement of the rotor; each module including two pole shoes, each of said pole shoes having a contact surface configured to contact a pole of the magnet, and extending over part of the surface of the magnet so that the magnet forms an overhang on a side of the magnet facing away from the air gap between the rotor and the stator, said pole shoes tapering starting from a surface of the rotor facing the stator of the electric machine, and said pole shoes deflecting the magnetic flux of the magnets in the direction of the stator; and
   a fixing device arranged in a space formed between two adjacent pole shoes of two adjacent modules;
   an essentially non-ferromagnetic or paramagnetic structure to which the pole shoes, magnets and/or modules are fastened, said structure supporting the modules for rotational movement relative to the electric machine.

2. The rotor of claim 1, wherein the rotor has a plurality of segments, and at least one rotor segment includes a plurality of adjacent modular elements.

3. The rotor of claim 1, further comprising a retaining projection on the stator side of the pole shoe for retaining the magnets.

4. The rotor of claim 1, wherein the support structure is made of an essentially diamagnetic material.

5. The rotor of claim 4, wherein the non-magnetic material is a non-magnetic light metal.

6. The rotor of claim 1, further comprising a fastening that has a projection arranged on the pole shoe and a stop notch on support structure, said fastening engaging said stop notch of the support structure.

7. The rotor of claim 1, wherein at least one magnet and at least one pole shoe of a module are joined together frictionally and/or positively with grout.

8. The rotor of claim 1, wherein the modules are joined frictionally and positively to the support structure with grout.

9. The rotor of claim 5 wherein the non-magnetic light metal is aluminum.

10. The rotor of claim 1 wherein the support structure is a stack of sheets, said sheets being stacked relative to the axis of rotation of the rotor, said sheets extending axially from the rotor and forming an axial extension of the rotor.

11. An electric machine, comprising: a stator, and a rotor, said rotor including a plurality of modules that are connected to each other and arranged adjacent to each other in the direction of the movement of the rotor, each module including at least one magnet, the poles of the magnet being aligned in the direction of movement of the rotor;

a fixing device arranged in a space formed between two adjacent pole shoes of two adjacent modules;

each module including two ferromagnetic pole shoes, each of said pole shoes extending over part of the surface of the magnet so that each shoe forms an overhang on a side of the magnet facing the air gap between the rotor and the stator, said pole shoes deflecting the magnetic flux of the magnets in the direction of the stator, each pole shoe tapering radially away from the exterior surface of the rotor; and an essentially non-ferromagnetic or paramagnetic structure to which the pole shoes, magnets and/or modules are fastened, said structure supporting the modules for rotational movement relative to the stator.

* * * * *